United States Patent [19]
Bauer et al.

[11] Patent Number: 4,488,777
[45] Date of Patent: Dec. 18, 1984

[54] REMOTELY ACTUATED REARVIEW MIRROR FOR AUTOMOTIVE VEHICLES

[75] Inventors: Frederick T. Bauer; Jon H. Bechtel, both of Holland, Mich.

[73] Assignee: Gentex Corporation, Zeeland, Mich.

[21] Appl. No.: 299,104

[22] Filed: Sep. 3, 1981

[51] Int. Cl.³ .............................................. G02B 17/00
[52] U.S. Cl. ................................. 350/279; 350/278; 350/281
[58] Field of Search ............... 350/278, 279, 280, 281, 350/289

[56] References Cited
U.S. PATENT DOCUMENTS

| | | | |
|---|---|---|---|
| 3,059,539 | 11/1962 | Meade | 350/281 |
| 3,680,951 | 8/1972 | Jordan et al. | 350/281 |
| 4,256,375 | 3/1981 | Sharp | 350/289 |

Primary Examiner—John K. Corbin
Assistant Examiner—Paul Dzierzynski
Attorney, Agent, or Firm—Malcolm R. McKinnon

[57] ABSTRACT

An improved inside rearview mirror for automotive vehicles, the mirror including a reflective element having a full reflectance mode and a partial reflectance mode, and also incorporating improved means including a conveniently situated, manually actuatable electrical switch for indexing the reflective element successively between the full reflective and partial reflective modes each time the switch is actuated.

18 Claims, 9 Drawing Figures

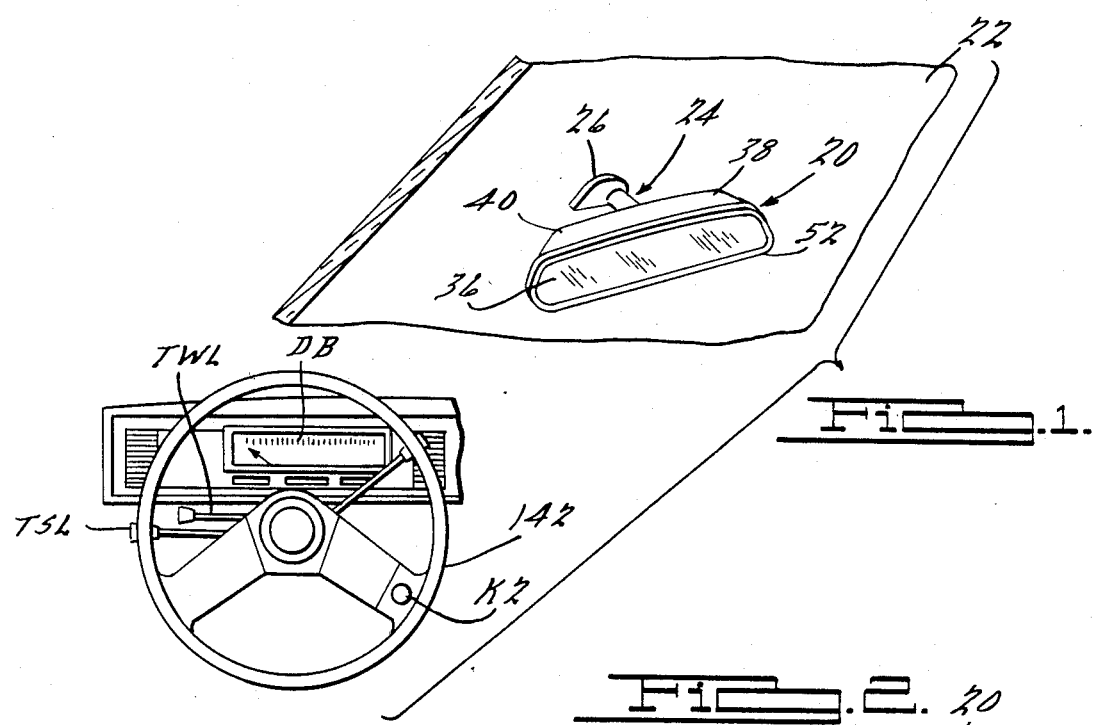
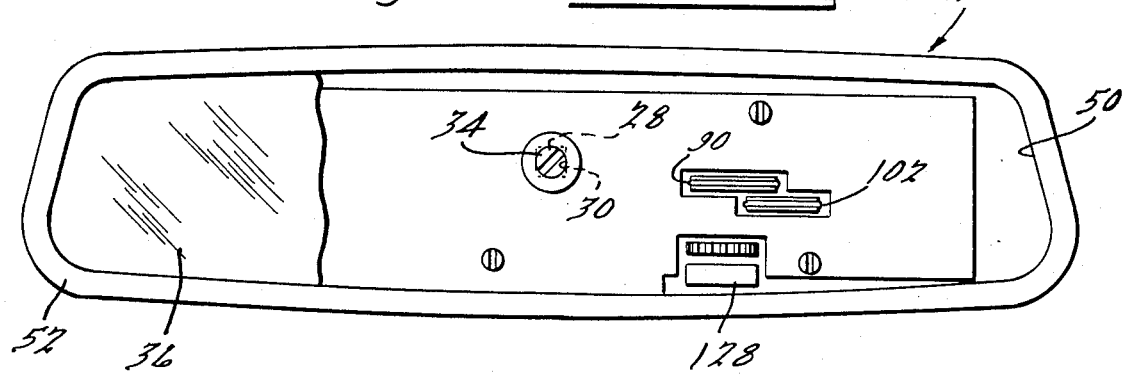
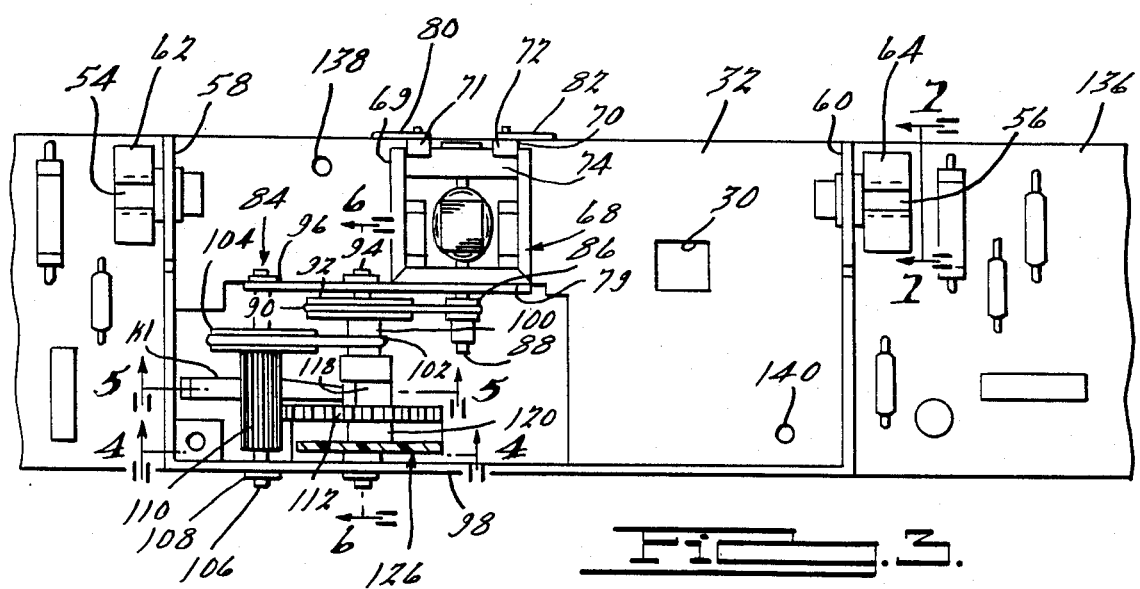

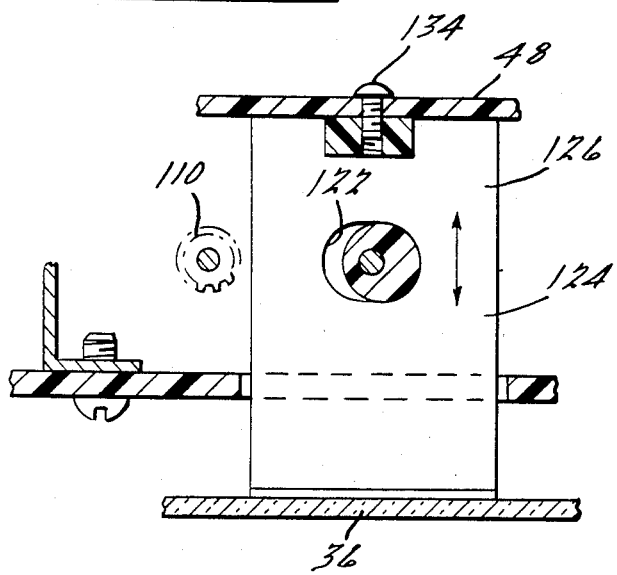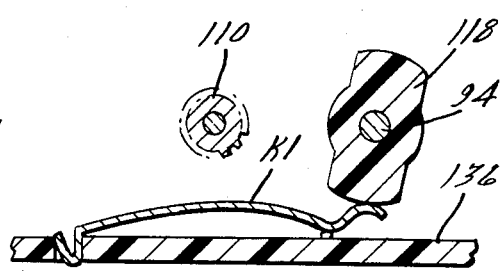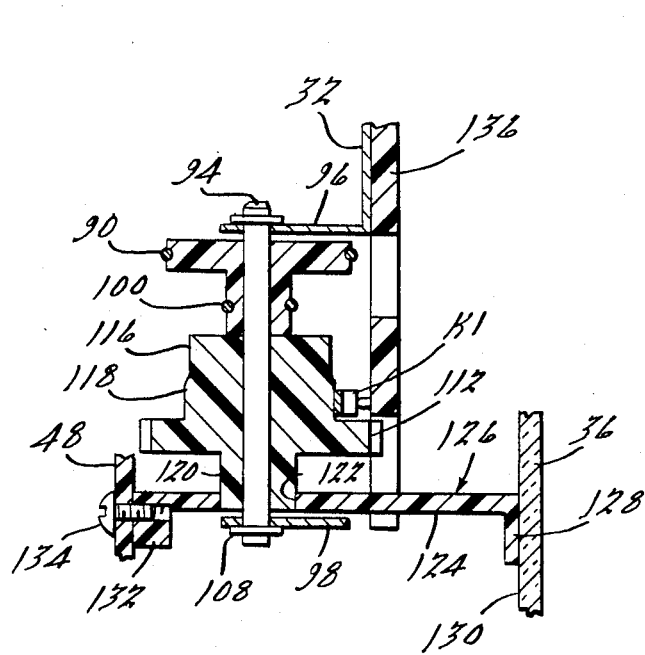

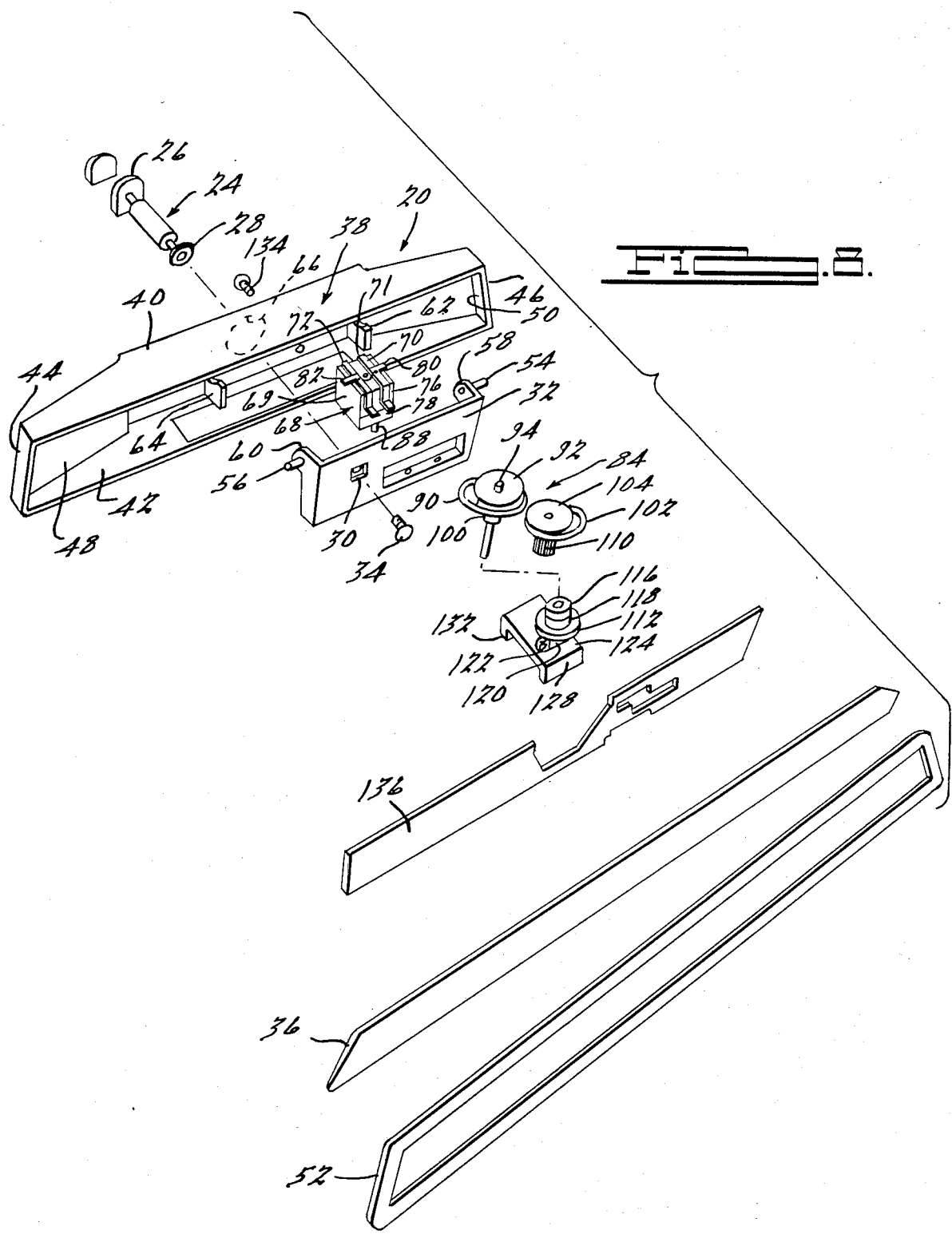

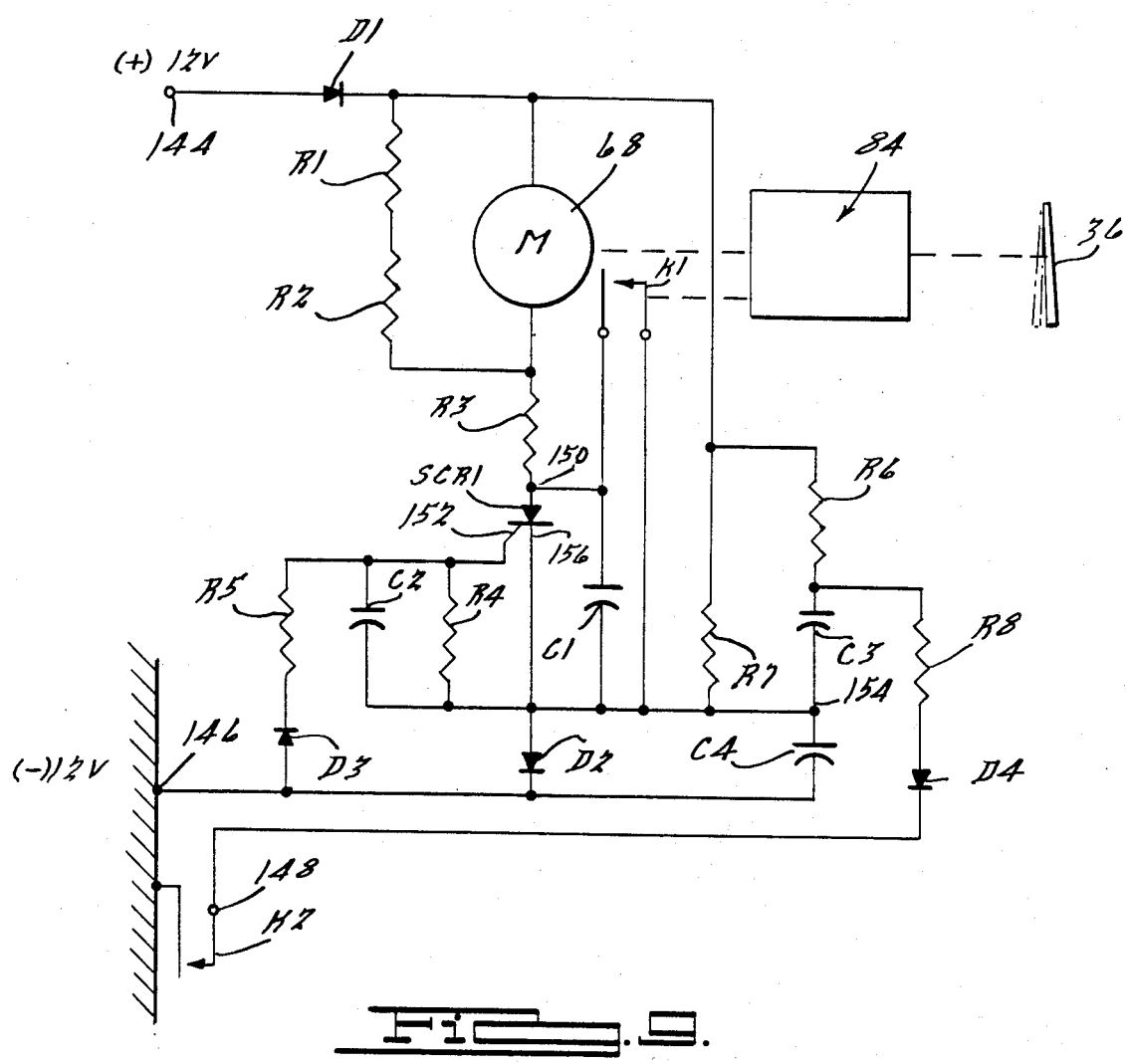

REMOTELY ACTUATED REARVIEW MIRROR FOR AUTOMOTIVE VEHICLES

BRIEF SUMMARY OF THE INVENTION

This invention relates to rearview mirrors for automotive vehicles and, more particularly, to an improved inside rearview mirror which is particularly adapted for use with automotive vehicles and which may be very conveniently indexed, by the driver of such a vehicle, from a full reflectance mode (day) to a partial reflectance mode (night) for glare protection from light emanating from the headlights of vehicles approaching from the rear. Rearview mirrors embodying the present invention incorporate a prism type reflective element which is substantially identical to the prism type reflective elements utilized in lever operated day-night mirrors conventionally provided on modern day automobiles. As is well known in the art, the driver of a vehicle equipped with such a lever operated mirror may adjust the mirror to a full reflectance mode or a partial reflectance mode by turning or flipping a lever located on the base of the mirror. However, such prior lever operated mirrors are often not used by numerous drivers because of the inconvenience involved in reaching up to the mirror to make the desired adjustment. In general, rearview mirrors embodying the present invention may be conveniently indexed to the alternate reflective mode each time that an electrical switch button is depressed by the driver of the vehicle, the switch button being positioned in a convenient location such as on or near the steering wheel of the vehicle. The power required to index the reflective element of the mirror is drawn either from the vehicle's electrical system or from a self contained battery.

Heretofore, automatic mirrors have also been devised for the purpose of automatically shifting the reflective element incorporated therein between the full reflectance and partial reflectance modes without requiring any action on the part of the driver of the vehicle. However, prior automatic mirrors of the indicated character are relatively expensive as compared with mirrors embodying the present invention, and many prior automatic mirrors have deficiencies (such as, for example, noisy operating characteristics, excessive vibration characteristics, high electrical current requirements, ungainly connections, poor clarity, poor performance characteristics at low operating temperatures, and slow operating times) that preclude practical operation of the devices with the result that lever operated mirrors of the type mentioned hereinabove are still normally provided as part of the original equipment of automotive vehicles manufactured throughout the world.

An object of the present invention is to overcome the aforementioned as well as other disadvantages in prior automotive vehicle mirrors of the indicated character and to provide an improved remotely actuated rearview mirror for automotive vehicles incorporating improved means for indexing a reflective element, incorporated in the mirror, successively between a full reflectance mode and a partial reflectance mode through the agency of electrical switch means positioned for easy accessibility by the driver of a vehicle.

Another object of the present invention is to provide an improved remotely actuated rearview mirror incorporating improved means whereby an indexing cycle of a reflective element incorporated therein is initiated by momentary closure of electrical switch means and once initiated, the indexing cycle is completed.

Another object of the present invention is to provide an improved remotely actuated rearview mirror wherein circuit operation is not initiated by any normal capacitance or radio frequency coupling to the mirror whereby special shielding requirements are obviated.

Another object of the present invention is to provide an improved remotely actuated rearview mirror wherein sustained closure of electrical switch means incorporated therein results in only one indexing step and wherein such electrical switch means must be opened and closed before another indexing step is initiated.

Another object of the present invention is to provide an improved remotely actuated rearview mirror incorporating improved means for moving a reflective element between a full reflectance mode and a partial reflectance mode and which means is relatively low in cost and yet capable of withstanding the severe electrical and physical environments normally encountered in automotive vehicles.

Another object of the present invention is to provide an improved remotely actuated rearview mirror which is relatively light in weight, small in size, quiet in operation and free of extraneous movement.

Another object of the present invention is to provide an improved remotely actuated rearview mirror incorporating improved means for indexing a reflective element successively between a full reflectance mode and a partial reflectance mode with a minimum of electrical power.

Another object of the present invention is to provide an improved remotely actuated rearview mirror incorporating improved means for supporting the components thereof whereby vibration is reduced to a minimum.

Another object of the present invention is to provide an improved remotely actuated rearview mirror that may be economically manufactured, assembled and installed with a minimum of time, labor and expense, and which mirror is strong and rugged in construction and reliable in operation.

The above as well as other objects and advantages of the present invention will become apparent from the following description, the appended claims and the accompanying drawings.

BRIEF DESCRIPTION OF THE DRAWINGS

FIG. 1 is a perspective view of a remotely actuated rearview mirror embodying the present invention, showing the same installed on the windshield of a vehicle, and also illustrating a steering wheel with an electrical switch mounted thereon for controlling the reflective state of the mirror;

FIG. 2 is an elevational view, with portions broken away, of the mirror illustrated in FIG. 1 as it faces the rear of the vehicle;

FIG. 3 is an elevational view of a portion of the mirror illustrated in FIG. 1 as it faces the front of the vehicle, showing the same with the housing removed for clarity of illustration;

FIG. 4 is a cross sectional view of a portion of the structure illustrated in FIG. 3, taken on the line 4—4 thereof;

FIG. 5 is a cross sectional view of a portion of the structure illustrated in FIG. 3, taken on the line 5—5 thereof;

FIG. 6 is a cross sectional view of a portion of the structure illustrated in FIG. 3, taken on the line 6—6 thereof;

FIG. 7 is a cross sectional view of a portion of the structure illustrated in FIG. 3, taken on the line 7—7 thereof;

FIG. 8 is a schematic exploded view of certain of the components of the mirror illustrated in FIG. 1; and FIG. 9 is a schematic electrical diagram of the mirror control circuitry embodying the present invention.

DETAILED DESCRIPTION

Referring to the drawings, a preferred embodiment of the invention is illustrated therein and is comprised of a remotely actuated rearview mirror, generally designated 20, which is adapted to be mounted on the inside of the windshield 22 of an automotive vehicle through the agency of a conventional mounting member 24 incorporating conventional ball and socket means (not shown) permitting angular adjustment of the mirror in a conventional manner. The outer end portion 26 of the mounting member 24 is fixed, for example by an adhesive, to the windshield 22 while the inner end portion of the mounting member is provided with a non-circular mounting block 28 adapted to be received in a similarly shaped hole 30 provided in a base 32, the base 32 being retained by a screw 34. In the preferred embodiment illustrated, the remotely actuated rearview mirror 20 includes a conventional prism type reflective element 36 which is mounted on a housing 38, the housing having top and bottom walls 40 and 42 integrally joined by side walls 44 and 46 and a rear wall 48 to define a chamber 50 which is open in the direction facing the rear of the vehicle. The prism type reflective element 36 is retained by a grommet 52 fitted over the free edge of the top, bottom and side walls of the housing whereby the reflective element 36 is permanently fixed to the housing 38. The housing 38, in turn, is pivotally connected to the base 32 through the agency of axially aligned trunnions 54 and 56 which are mounted in spaced, outwardly projecting flanges 58 and 60, respectively, provided on the base 32, the trunnions 54 and 56 being supported in bearings 62 and 64, respectively, formed integrally with the back wall of the housing, as shown in FIGS. 3, 7 and 8, whereby the reflective element 36 and the housing 38 may be pivoted as a unit relative to the base 32, the central portion of the mounting member 24 passing through an opening 66 provided in the rear wall 48 of the housing with sufficient clearance to permit the pivotal movement of the reflective element and the housing relative to the mounting member 24 whereby the reflective element may be moved from a full reflective mode to a partial reflective mode and thereafter returned to the full reflective mode by pivoting the reflective element and the housing as a unit about the aligned longitudinal axis of the trunnions 54 and 56.

In the embodiment of the invention illustrated, a small, unidirectional DC motor 68 is provided as the prime mover for moving the reflective element 36 and the housing 38 between the full reflectance and partial reflectance positions. The motor 68 includes a housing 69 which is mounted on the base 32 through the agency of a mounting bracket 70 that includes a pair of L-shaped leg portions 71 and 72, which engage the front wall 74 of the motor housing, and an integral base portion 76 which engages the rear wall 78 of the motor housing. The bottom wall 79 of the motor housing 69 is supported by an outwardly projecting flange 96 which is formed as an integral part of the base 32. The mounting bracket 70 also carries electrical connectors 80 and 82 which make electrical contact with the motor, and the electrical connectors 80 and 82 are soldered to a printed circuit board 136 which is fixed to the base 32, as with screws 138 and 140, the printed circuit board 136 being disposed within the chamber 50 defined by the housing and carrying various components and electrical conductor paths of the control circuitry embodying the invention. The solder connection provides both an electrical connection to the printed circuit board and a mechanical support for the mounting bracket 70. Thus, the mounting bracket 70 and the electrical connectors carried thereby make the necessary electrical connections to the motor 68 and also aid in the support and retention of the motor.

A three stage speed reduction, generally designated 84, is provided for the motor 68, such speed reduction being comprised of a drive pulley 86 which is fixed to the drive shaft 88 of the motor 68. By means of an O-ring belt 90, the drive pulley 86 drives a pulley 92 carried by a shaft 94 supported by outwardly projecting flanges 96 and 98 provided on the base 32, the shaft 94 also carrying a pulley 100 which by means of an O-ring belt 102 drives an integral pulley 104 and a pinion 110 carried by a shaft 106 also supported by the flanges 96 and 98, the shafts 94 and 106 being retained by any suitable means, such as snap rings 108. The pinion 110 drives a spur gear 112 mounted on the shaft 94. Integral with the spur gear 112 are a switch cam 118 and an eccentric cam 120 disposed in a passageway 122 defined by the web portion 124 of a generally channel shaped bridge member 126. The bridge member 126 includes a flange portion 128 which is held against the inside surface 130 of the reflective element 36. The bridge member 126 also includes a flange portion 132 which is fixed to the wall 48 through the agency of a screw 134. With such a construction, rotation of the eccentric cam 120 causes the eccentric bridge 126 to translate thereby pivoting the reflective element 36 and the housing 38 as a unit about the aligned axes of the trunnions 54 and 56 to move the reflective element 36 between the full reflectance and partial reflectance modes. The switch cam 118 functions to close and open the contacts of the limit switch K1 to energize and de-energize the motor as will be described hereinafter in greater detail, the contacts of the limit switch K1 being open in both the full reflectance position and the partial reflectance position of the reflective element 36 and closed when the reflective element is intermediate such positions.

In the embodiment of the invention illustrated, a manually actuatable electrical switch K2 is provided which is mounted on the steering wheel 142 of the vehicle and positioned for convenient actuation by the driver of the vehicle, the switch K2 being electrically connected by any suitable electrical conductors in the mirror control circuitry illustrated in FIG. 9. While the switch K2 is illustrated as being in the form of a push button switch, it will be understood that other forms of manually actuatable switches may be utilized. It will also be understood that the switch K2 may be mounted in any other position conveniently accessible to the driver, as for example, the switch K2 may be mounted on the turn signal lever TSL, on the tilt-wheel lever TWL, on the dashboard DB or in any other position convenient for the driver. Rotation of the unidirectionally driven DC motor 68 is initiated by a momentary closing of the switch K2 whenever a change in reflective state is required. Circuit action is such that an indexing cycle is initiated by a very short closure of the switch K2, and once initiated, the indexing cycle is completed. Sustained closure of the switch K2 results in only one indexing step, and the switch K2 must be opened and closed again to index another step.

Referring to FIG. 9, the circuitry embodying the present invention is illustrated therein. As shown in FIG. 9, the circuit is energized by a positive voltage at the terminal 144, which voltage may be supplied by the vehicle electrical system or by a self-contained battery. The terminal 146 is connected to the electrical system ground such as the vehicle chassis. The terminal 148 is the control input which is momentarily connected to ground through the switch K2 to initiate a change to the alternate reflective state. The circuitry also includes the unidirectional DC motor 68, the switches K1 and K2, diodes D1, D2, D3 and D4, a silicon controlled rectifier SCR1, capacitors C1 through C4 and resistors R1 through R8, such components all being electrically connected by suitable conductors as illustrated in the drawings and as will be described hereinafter in greater detail.

As previously mentioned, the unidirectional DC Motor 68 rotates the eccentric cam 120 through the three stage speed reduction 84 to move the reflective element 36 between its reflective positions. The contacts of the switch K1 are closed except when the reflective element 36 is in each of its two stable positions. The contacts of the switch K1 open and de-energize the motor 68 when the reflective element is positioned in its desired reflective state.

The diodes D1 and D4 prevent damage to the circuit due to incorrect wiring. The resistors R1 and R2 conduct current generated by the motor 68 when it is de-energized and still coasting. This provides braking action to prevent the reflective element 36 from coasting on through its stop positions and continuing to oscillate under high supply voltage conditions. The current conducted by the resistors R1 and R2 while the silicon controlled rectifier SCR1 is conducting prevents turn-off of the silicon controlled rectifier. Such turn-off may otherwise occur due to an interruption of the motor current caused by faulty brush contact in the motor 68. The resistors R1 and R2 are preferably widely spaced and, in the embodiment of the invention illustrated, are used in place of one resistor to distribute the heat they dissipate. This prevents damage from heat generated in the event that the resistors R1 and R2 remain energized due to a fault condition. The resistors R1 and R2 are also preferably made of a high temperature coefficient wire so that their resistance increases and limits heating under the fault condition mentioned hereinabove.

The capacitor C3 is charged through the resistor R6, and the diode D2 is forward biased by current through the resistor R7. The capacitor C1 limits rapid voltage excursions at the anode 150 of the silicon controlled rectifier SCR1 to prevent unwanted turn-on of the silicon controlled rectifier. The resistor R4 prevents turn-on of the silicon controlled rectifier due to leakage current at its gate 152. The capacitor C2 prevents turn-on of the silicon controlled rectifier due to interference generated transient voltages at the gate. The diode D3 adds to the turn-on noise margin of the silicon controlled rectifier and prevents sinking of gate current through the resistor R5 and a possibility of a resulting gate turn-off of the silicon controlled rectifier. The resistor R3 limits motor current.

The switch K1 is actuated by the cam 118 in the gear reduction unit, the switch K1 being open when the reflective element 36 is in each of its stable positions. The switch K1 closes during the traverse of the unit between each of its stable positions. Closure of the switch K1 shorts the silicon controlled rectifier allowing the silicon controlled rectifier to turn-off, and the switch K1 continues to energize the motor 68 until the reflective element 36 has indexed to its next stable position at which point the cam 118 opens the switch K1 and the reflective element 36 comes to rest.

In the operation of the motor control circuit, closure of the switch K2 discharges the capacitor C3 through the resistor R8 and the diode D4. The capacitor C4 receives negative charge from the capacitor C3 at the terminal 154 which goes negative. The diode D2 is reverse biased and the cathode 156 of the silicon controlled rectifier goes negative thereby forward biasing the diode D3 and causing gate current to flow through the diode D3 and the resistor R5 into the gate terminal 152 of the silicon controlled rectifier. The silicon controlled rectifier then turns on and energizes the motor 68 through the resistor R3. The cam 118 in the gear reduction unit closes the switch K1 and the silicon controlled rectifier is turned off. The reflective element 36 is then carried to its next stable position as previously mentioned. Discharge of the capacitor C3 is rapid and the switch K2 must be opened to allow the capacitor C3 to recharge through the resistor R6 before another cycle can be initiated. After turn-on of the silicon controlled rectifier, the capacitor C4 charges rapidly and the diode D2 conducts the motor current. Typical values for the components of the circuitry described hereinabove are as follows:

R1—15 ohm
R2—15 ohm
R3—3.9 ohm
R4—1 K ohm
R5—100 ohm
R6—10 K ohm
R7—2.2 K ohm
R8—10 ohm
C1—0.047 MFD, 250 V
C2—0.022 MFD, 16 V
C3—3.3 MFD, 50 V
C4—4.7 MFD, 10 V Nonpolar
D1—IN4004
D2—IN4004
D3—IN4148
D4—IN4004
SCR1—SC203D, Silicon Controlled Rectifier In the operation of the mirror 20, upon entering the vehicle, the driver should adjust the reflective element 36 for good rearward vision. If the headlights of a vehicle approaching from the rear tend to cause annoying glare, the driver may momentarily close the switch K2 to initiate movement of the reflective element 36 to the antiglare position and the following chain of events will take place. The motor 68 is energized and begins rotating to drive the three stage speed reduction 84 to rotate the eccentric cam 120 which causes the eccentric bridge 126 to translate, thereby moving the reflective element 36 and the mirror housing 38 as a unit to the antiglare position. The contacts of the switch K1 open and deenergize the motor 68 when the reflective element 36 is positioned in the desired antiglare position. The reflective element 36 is then held securely in the antiglare position until the source of the glare is removed. When the source of the glare is removed, the driver may again momentarily close the switch K2 to signal the motor 68 to reinitiate rotation, again driving the three stage speed reduction 84 to cause the switch cam 118 and the eccentric cam 120 to rotate, thereby closing the limit switch K1 and also moving the reflective element 36 through the agency of the eccentric bridge to return the reflective element to the full reflective mode. At this point, the limit switch K1 opens and the cycle is completed. The reflective element 36 will then be held securely in the full reflectance mode until another source of annoying glare is encountered, whereupon the driver may cause the cycle to be repeated.

From the foregoing it will be appreciated that with the present invention, a small, very low cost unidirectional DC motor is utilized as the prime mover for the reflectance element. The use of a unidirectional DC motor driving through a combination belt drive and gear drive system makes it possible to have high force available to move the reflectance element because several revolutions of the motor can be utilized to do the work. The small motor that can be utilized is significantly lighter in weight than a solenoid. Moreover, the small motor and drive train embodying the present invention allows the total mirror package to be similar to a standard day-night mirror in overall size. Because of the high force available, the reflective element can be permanently fixed to the mirror housing and the reflective element and the housing moved as a unit to shift from a full reflectance mode to a partial reflectance mode and back again whereby a distinct advantage in controlling vibrations is obtained. Moreover, no return spring system is required, so the entire system is tight and free of extraneous movement which would contribute to vibration problems. The belt drive in the first two stages of the speed reduction unit 84 acts to silence the operation of the mirror 20, thereby making it quieter than solenoid operated devices. (It is preferred that the O-rings in the first two stages of the speed reduction unit 84 be made of silicone rubber since such rubber is resistant to high temperatures and retains its flexibility at very low temperatures.) The third stage of the speed reduction unit 84 is a low cost pinion and spur gear arrangement with the result that the speed reduction system is very quiet and can be produced at low cost.

The switch K2 provides a single pole momentary contact to ground and the circuitry embodying the present invention accomodates this mode of switch action so that the switching function is accomplished through a single control line to the mirror. Circuit action is such that an indexing cycle is initiated by a very short closure of the switch, and once initiated, the indexing cycle is completed. Circuit operation is not initiated by any normal capacitance or radio frequency coupling to the control line or to the mirror circuit, and lines to the mirror may be routed normally with no special shielding requirements. Moreover, the circuit components are low in cost and yet are able to withstand the severe electrical and physical environments encountered in automotive vehicles.

The mounting of the reflective element permanently on the mirror housing and moving the reflective element and the housing as a unit reduces vibration to a minimum, and the reflective element and the housing are firmly held in both the full reflectance and partial reflectance positions. The limit switch K1 that controls the end positions of the mirror cycle is operated from the switch cam 118 so that the final positions are closely controlled.

While a preferred embodiment of the invention has been illustrated and described, it will be understood that various changes and modifications may be made without departing from the spirit of the invention.

What is claimed is:

1. A remotely actuated rearview mirror for an automotive vehicle, said mirror comprising, in combination, a reflective element having a full reflectance mode and a partial reflectance mode, eccentric cam means connected to said reflective element, means including unidirectional, rotatable DC motor means operable upon multiple revolutions thereof to drive said cam means and index said reflective element successively between said full reflectance and partial reflectance modes, means including manually actuatable switch means operable to initiate energization of said DC motor means, and additional switch means controlling the energization of said DC motor means, to de-energize said DC motor means when said reflective element is in either of its reflective modes.

2. The combination as set forth in claim 1 including speed reduction means operatively connected to said DC motor means, said eccentric cam means being driven by said speed reduction means to translate said reflective element successively between said full reflectance and partial reflectance modes.

3. The combination as set forth in claim 1 including resistance means connected in parallel with said DC motor means and effective to provide a braking action on said DC motor means when said DC motor means is de-energized 4. In a remotely actuated rearview mirror for an automotive vehicle, the combination including a reflective element having a full reflectance mode and a partial reflectance mode, eccentric cam means connected to said reflective element, a unidirectional, rotatable DC motor operable upon multiple revolutions thereof to drive said cam means and index said reflective element successively between said full reflectance and partial reflectance modes, means controlling the initial energization of said DC motor including a silicon controlled rectifier having an anode, a cathode, and a gate, said anode and said cathode being connected in series with said DC motor, means including capacitance means and diode means connected to said gate and controlling the conductivity of said silicon controlled rectifier between said anode and said cathode, manually actuatable switch means controlling the charge on said capacitance means, and additional switch means controlling the energization of said DC motor to de-energize said DC motor means when said reflective element is in either of its reflective modes.

5. The combination as set forth in claim 4 including resistance means connected in parallel with said DC motor and in series with said anode and said cathode and effective to provide a braking action on said DC motor when said DC motor is de-energized.

6. The combination as set forth in claim 5 including additional resistance means and additional diode means connected in series with said manually actuatable switch means and in parallel with said capacitance means.

7. The combination as set forth in claim 6 including means limiting rapid voltage excursions at said anode to prevent extraneous turn-on of said silicon controlled rectifier.

8. In a remotely actuated rearview mirror for an automotive vehicle, the combination including a reflective element having a full reflectance mode and a partial reflectance mode, a housing defining a chamber open in the direction facing the rear of the vehicle, a base disposed within the chamber defined by said housing, means fixing said reflective element to said housing, means pivotally connecting said housing to said base whereby said reflective element and said housing may be moved as a unit between the full reflectance mode and the partial reflectance mode of said reflective element, eccentric cam means connected to said reflective element, means including unidirectional, rotatable DC motor means operable upon multiple revolutions thereof to drive said cam means and pivot said housing and reflective element as a unit between said modes relative to said base, manually actuatable switch means located for convenient actuation by the driver of said vehicle and operable to initiate energization of said DC motor means, and additional switch means controlling the energization of said DC motor means when said reflective element is disposed intermediate said full reflectance mode and said partial reflectance mode and de-energizing said DC motor means when said reflective element is in either of its reflective modes.

9. The combination as set forth in claim 8 including speed reduction means operatively connected to said DC motor means and said eccentric cam means.

10. In a remotely actuated rearview mirror for an automotive vehicle, the combination including a reflective element having a full reflectance mode and a partial reflectance mode, a housing defining a chamber open in the direction facing the rear of the vehicle, a base disposed within the chamber defined by said housing, means fixing said reflective element to said housing, means pivotally connecting said housing to said base whereby said reflective element and said housing may be moved as a unit between the full reflectance mode and the partial reflectance mode of said reflective element, eccentric cam means connected to said reflective element, means including DC motor means operable to drive said cam means and pivot said housing and reflective element as a unit relative to said base, manually actuatable switch means located for convenient actuation by the driver of said vehicle and operable to initiate energization of said DC motor means, additional switch means controlling the energization of said DC motor means when said reflective element is disposed intermediate said full reflectance mode and said partial reflectance mode and de-energizing said DC motor means when said reflective element is in either of its reflective modes, speed reduction means operatively connected to said DC motor means, said speed reduction means including noise reduction means comprising belt and pulley means.

11. The combination as set forth in claim 10, said eccentric cam means being driven by said speed reduction means and being effective to translate said reflective element and said housing relative to said base.

12. In a remotely actuated rearview mirror for an automotive vehicle, the combination including a reflective element in the form of a prism and having a full reflectance mode and a partial reflectance mode, a housing defining a chamber, a base disposed within the chamber defined by said housing, means fixing said reflective element to said housing whereby said reflective element faces the rear of the vehicle, means pivotally connecting said housing to said base whereby said reflective element and said housing may be moved as a unit between the full reflectance mode and the partial reflectance mode of said reflective element, eccentric cam means connected to said reflective element, a unidirectional, rotatable DC motor mounted on said base and operable upon multiple revolutions thereof to drive said cam means and pivot said reflective element and said housing as a unit relative to said base, means controlling the energization of said DC motor including a silicon controlled rectifier having an anode, a cathode and a gate, said anode and said cathode being connected in series with said DC motor, resistance means connected in parallel with said DC motor and in series with said anode and said cathode and effective to provide a braking action on said DC motor when said DC motor is de-energized, means including capacitance means and diode means connected to said gate and controlling the conductivity of said silicon controlled rectifier between said anode and said cathode, manually actuatable switch means located for convenient actuation by the driver of said vehicle and controlling the charge on said capacitance means, and additional switch means controlling the energization of said DC motor and de-energizing said DC motor means when said reflective element is in either of its reflective modes.

13. The combination as set forth in claim 12 including speed reduction means operatively connected to said DC motor, said eccentric cam means being driven by said speed reduction means and being effective to translate said reflective element and said housing and pivot said reflective element and said housing as a unit relative to said base.

14. The combination as set forth in claim 13, said speed reuction means comprising three stages, two of said stages including noise reduction means comprising belt and pulley means driven by said DC motor, the third stage of said speed reduction means comprising pinion and gear means driven by said belt and pulley means, said eccentric cam means being driven by said gear means.

15. The combination as set forth in claim 12 including additional resistance means and additional diode means connected in series with said manually actuatable switch means and in parallel with said capacitance means.

16. The combination as set forth in claim 12 including means limiting rapid voltage excursions at said anode to prevent extraneous turn-on of said silicon controlled rectifier.

17. The combination as set forth in claim 12, said vehicle including a steering wheel, said manually actuatable switch means being located near said steering wheel.

18. The combination as set forth in claim 12, said vehicle including a steering wheel, said manually actuatable switch means being located on said steering wheel.

* * * * *